April 22, 1941.  A. HENDERSON  2,239,195
METHOD AND APPARATUS FOR MOLDING SLABS
Filed Jan. 23, 1939  6 Sheets—Sheet 1
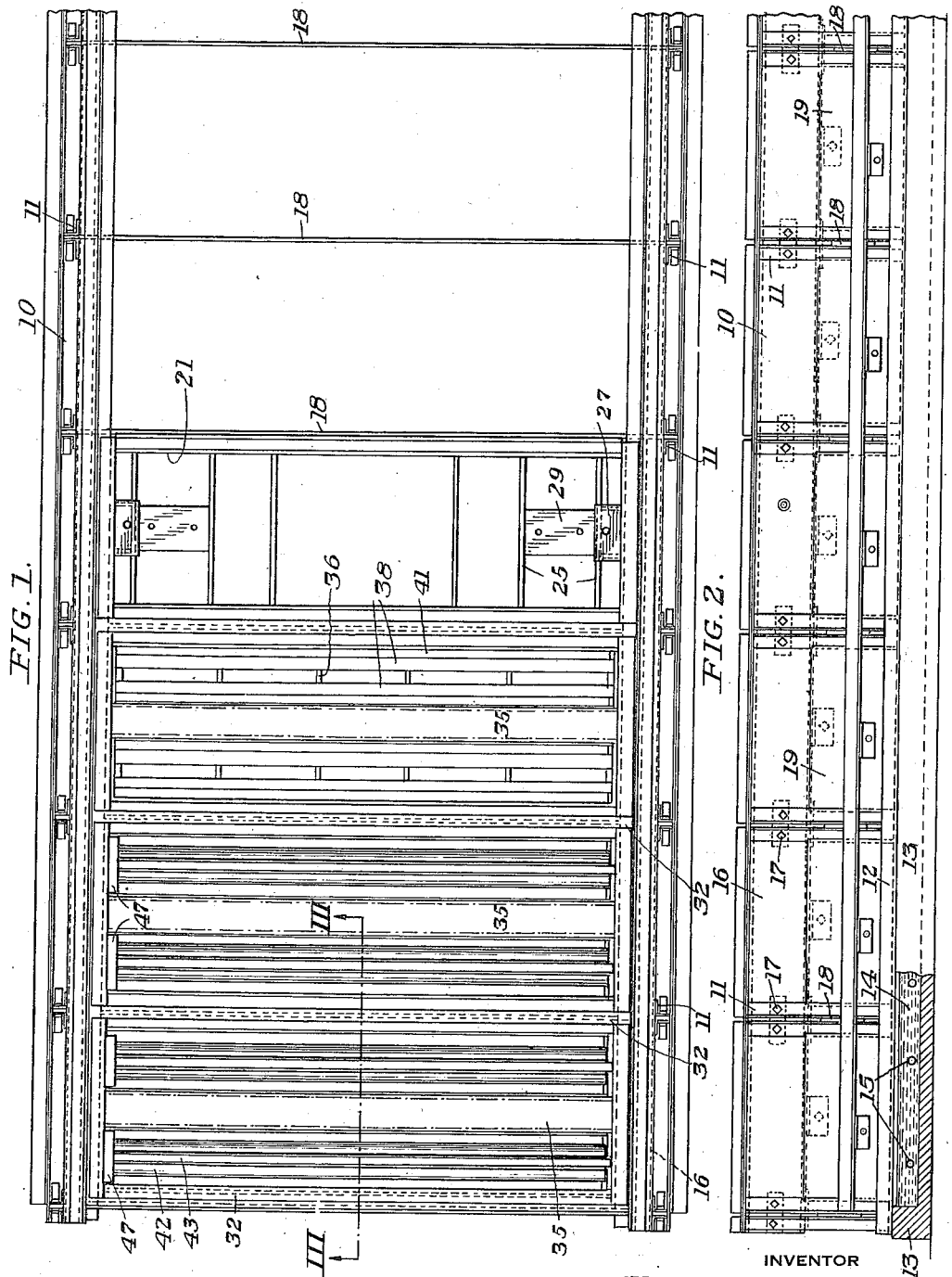
INVENTOR
Albert Henderson
by his attorneys
Stebbins, Blenko & Parmelee

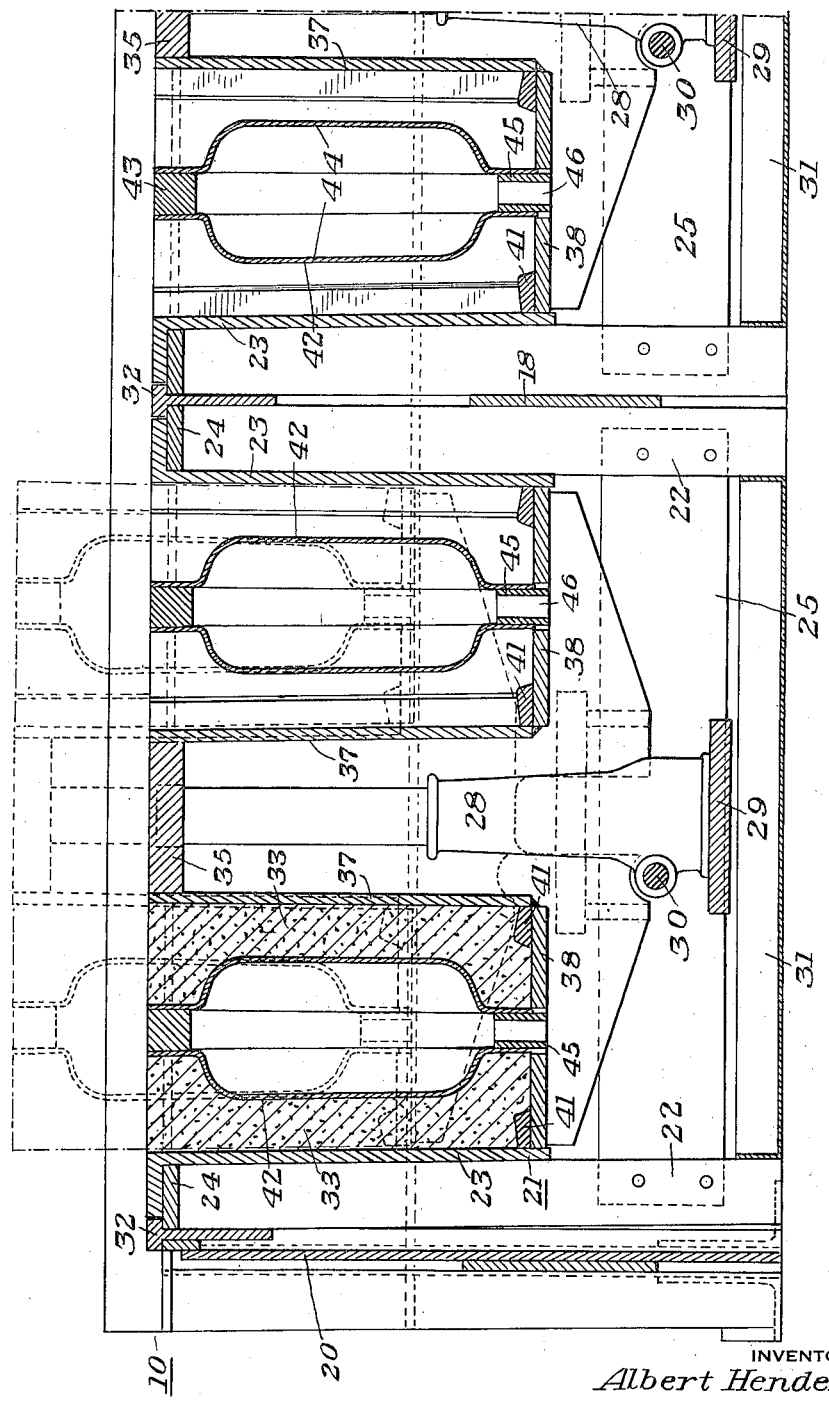

April 22, 1941.　　　A. HENDERSON　　　2,239,195
METHOD AND APPARATUS FOR MOLDING SLABS
Filed Jan. 23, 1939　　　6 Sheets-Sheet 3
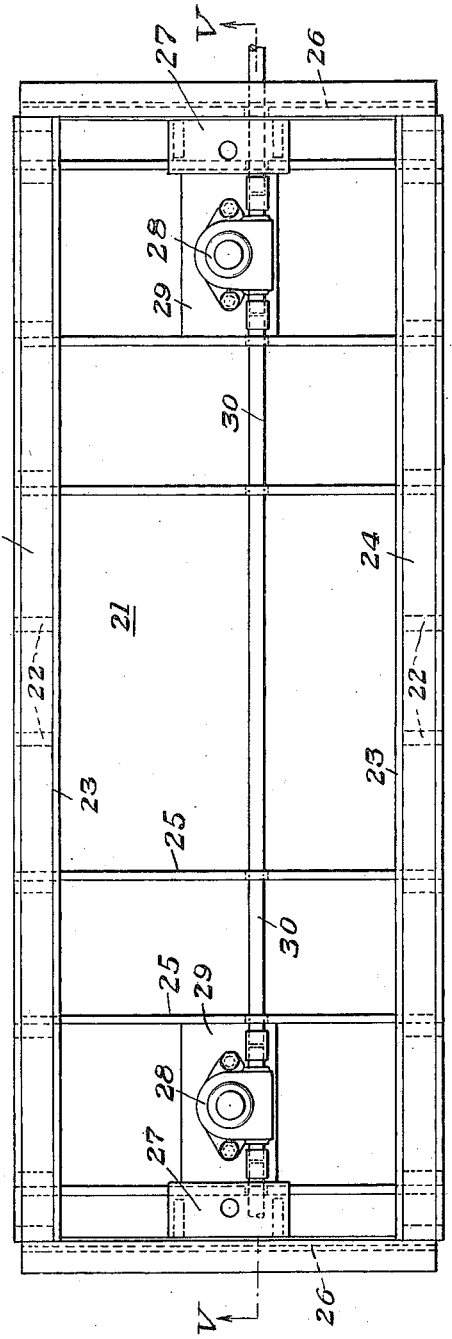
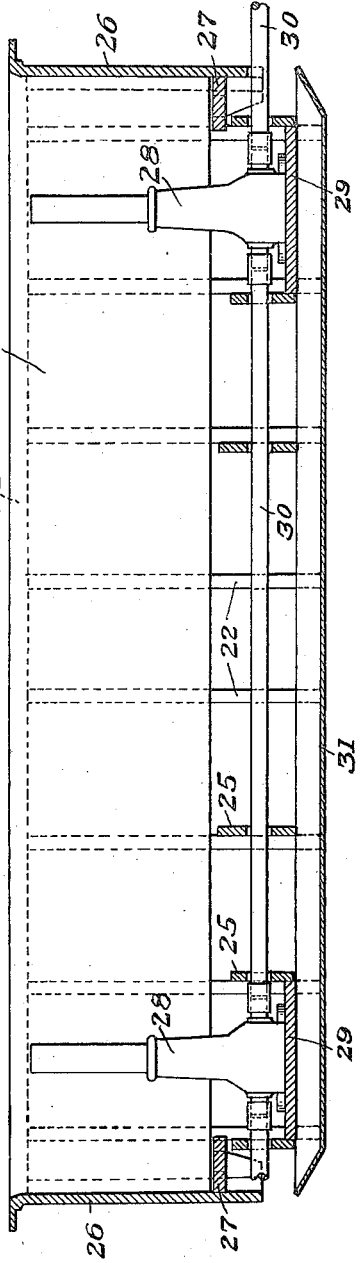
INVENTOR
Albert Henderson
by his attorneys
Stebbins, Blenko & Parmelee April 22, 1941.   A. HENDERSON   2,239,195
METHOD AND APPARATUS FOR MOLDING SLABS
Filed Jan. 23, 1939   6 Sheets-Sheet 4
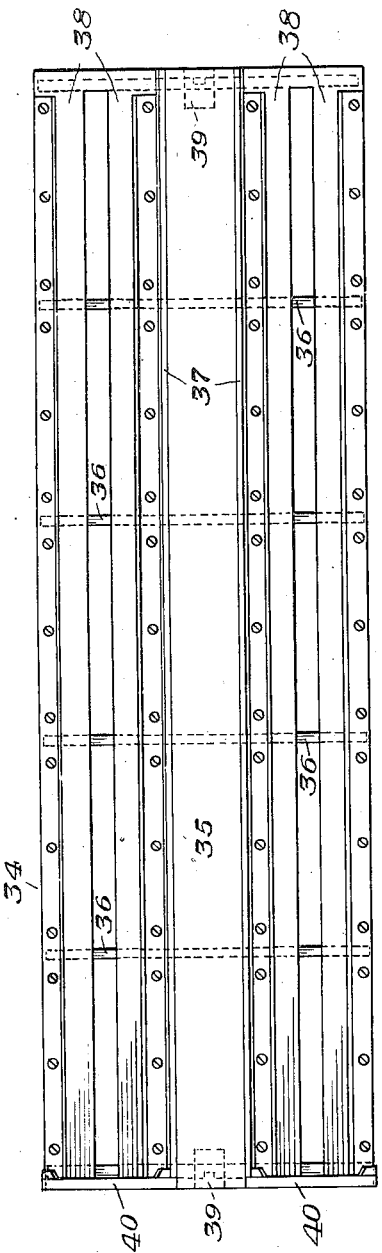
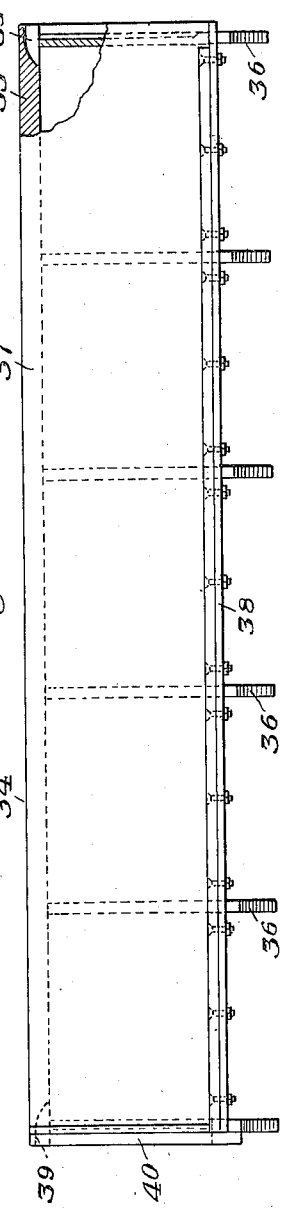
INVENTOR
Albert Henderson
by his attorneys
Stebbins, Blenko & Parmelee

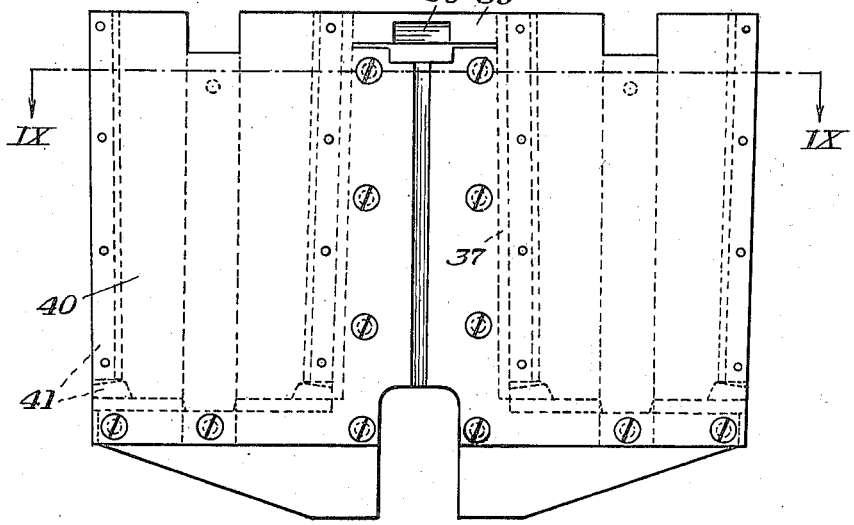
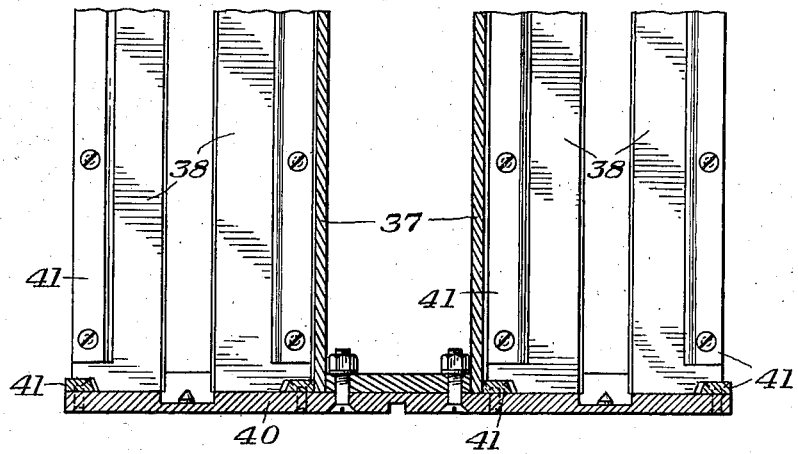
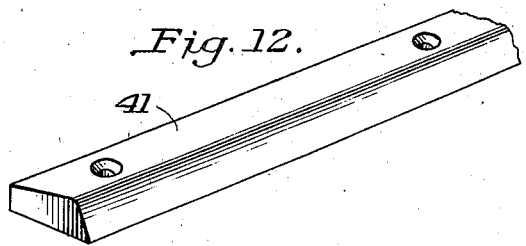

Patented Apr. 22, 1941

2,239,195

UNITED STATES PATENT OFFICE 2,239,195

METHOD AND APPARATUS FOR MOLDING SLABS

Albert Henderson, Pittsburgh, Pa., assignor to William P. Witherow, Pittsburgh, Pa.

Application January 23, 1939, Serial No. 252,316

16 Claims. (Cl. 25—121)

This invention relates to the manufacture of molded articles such as slabs of cementitious material or the like having numerous applications in the construction of buildings, pavements, etc.

While numerous forms of molds have been developed for various types of articles adapted to be manufactured by molding, I am not familiar with any which are entirely satisfactory from the standpoint of simplicity of construction and ease of operation necessary to the production of molded articles in quantity. It is the general object of the invention, therefore, to improve upon molding apparatus known heretofore and, in particular, to provide a slab molding method and apparatus adapted to coact with a traveling mixer or hopper, at relatively high speed so that production of articles in substantial volume is expedited.

A preferred embodiment of the invention comprises a supporting and enclosing frame having a plurality of mold boxes or shells removably disposed therein side by side and mounted for individual vibration. A pallet removably disposed in each shell supports cores adapted to form voids in the molded articles.

The method which I practice by the aid of the aforementioned apparatus includes the pouring of the articles in the molds, and the partial ejection of the articles from the molds after they have been partly cured therein. After completion of the curing, in the partly ejected position, the articles are finally removed from the molds by applying lifting force to the cores. After removal from the molds, the articles are detached from the cores and the latter returned to the molds for another molding cycle.

The invention will be described in detail by referring to the accompanying drawings illustrating the present preferred embodiment and practice. In the drawings—

Fig. 1 is a plan view of a molding apparatus with parts removed;

Fig. 2 is a side elevation, partly broken away;

Fig. 3 is a partial sectional view taken along the line III—III of Fig. 1;

Fig. 4 is a plan view of one of the shells apart from its supporting frame;

Fig. 5 is a sectional view taken substantially along the plane of line V—V of Fig. 4;

Fig. 6 is a plan view of a pallet assembly adapted to be inserted in the shell shown in Fig. 4;

Fig. 7 is a side elevation of the pallet assembly, partly broken away;

Fig. 8 is an end view of the pallet such as would be seen by looking from the left in Fig. 6;

Fig. 9 is a sectional view taken substantially along the plane of line IX—IX of Fig. 8;

Fig. 12 is a perspective view showing one end of a rabbet-forming bar carried on the pallet assembly.

Figure 11:
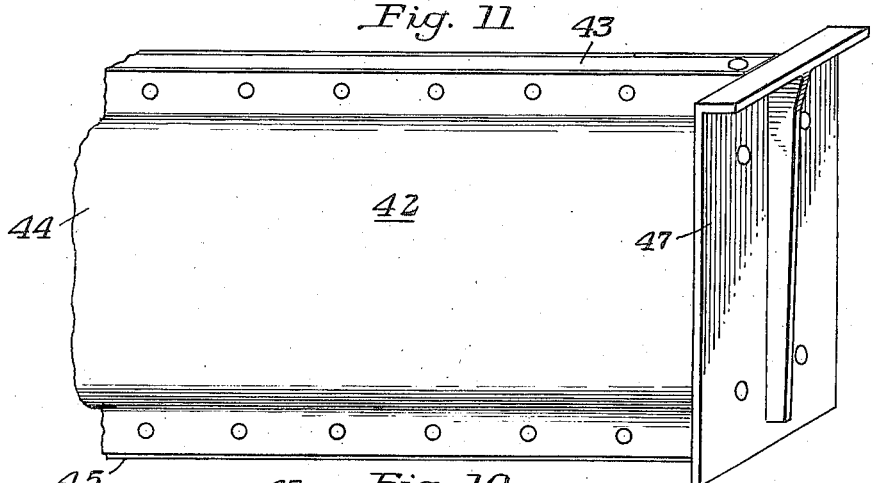
Fig. 11 is a perspective view of one end of one of the cores.
Figure 10:
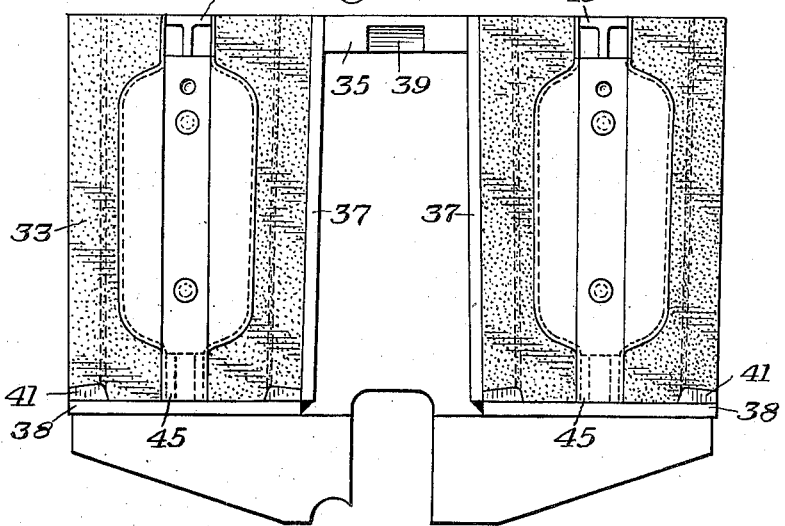
Fig. 10 is an end elevation of a pallet assembly with the cores and molded articles thereon.

Referring now in detail to the drawings, the supporting and enclosing frame indicated generally at 10 comprises angle posts 11 disposed in pairs and spaced along each side of the frame. The posts 11 extend upwardly from footing angles 12 carried on any suitable foundation 13 which may conveniently provide a trough or pool 14 adapted to contain water and provided with heating means such as steam pipes 15 for a purpose to be described later.

Side channels 16 are secured to the posts 11 by bolts 17 and beams 18 extend across the frame 10 between alined pairs of posts. Removable doors 19 extend between adjacent pairs of posts 11 on each side of the frame 10 and the ends of the frame are closed by plates 20.

A plurality of cradles or shells 21 are removably disposed side by side in the frame 10 between adjacent cross beams 18. The construction of the shells 21 is best shown in Figs. 3 through 5. Spaced posts 22 carry side walls 23 and plates 24 extend over the tops of the posts. Cross beams 25 connect several alined pairs of posts and end walls 26 extend between the ends of the side walls 23. Abutments 27 are carried on the end walls and extend inwardly therefrom for a purpose which will shortly appear. Jacks 28 are mounted on plates 29 secured to adjacent cross beams 25. The jacks 28 may be simultaneously operated by shafting 30 extending longitudinally of the shell. A pan 31 for collecting drippings, leakage, etc. is secured to the lower ends of the posts 22.

As shown in Figs. 1 and 3, the shells 21 are disposed side by side in the frame 10 with spacer bars 32 therebetween. These bars may be secured to the channels 16 by any convenient means such as bolts. The shells are preferably mounted on resilient means carried by the frame 10 for vibration thereon, as described and claimed in my co-pending application, Ser. No. 239,255.

Figure 13:
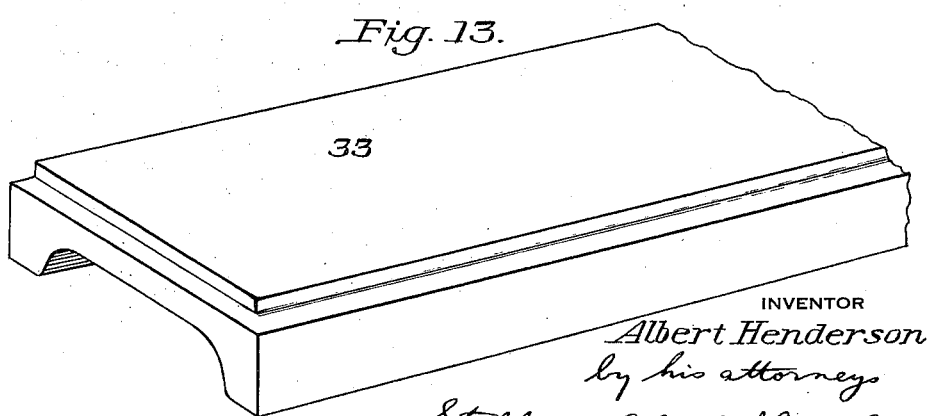
Fig. 13 is a partial perspective view of a slab, for the molding of which the apparatus shown in Figs. 1 through 12 is adapted.

The side walls 23 of the shells serve, with other parts to be described later, to define molds for the formation of slabs such as that shown at 33 in Fig. 13. Certain of the remaining walls of such molds form part of a pallet assembly shown in Figs. 3 and 6 through 8. The assembly indicated generally at 24 includes a longitudinal beam 35, hanger plates 36 spaced therealong, side walls 37, and bottom plates 38, all the aforesaid portions being welded together to form a rigid carrier for the articles to be molded. The ends of the beam 35 are recessed as at 39 to receive lifting members of appropriate shape. Plates 40 secured to the assembly 34 at one end thereof provide end walls for the molds of which the plates 23 and 37 are the side walls and the plates 38 the bottoms. Rabbet-forming strips 41 are secured to the plates 38 and 40 as shown in Figs. 6 and 7 for the purpose of forming a rabbeted edge on one side and one end of each slab.

The pallet assembly 34 is adapted to be removably disposed in one of the shells 21, being supported therein by the abutments 27 so as to be liftable by the jacks 28, the extensible members of which bear on the undersurface of the beam 35. It will be apparent that each pallet assembly, when disposed in a shell, provides a pair of molds extending substantially the length of the shell.

A core 42 is removably disposed on each of the bottom plates 38. Each core includes a top bar 43, side walls 44 of appropriate shape, and a bottom bar 45. The bar 45 has openings 46 therein. The plates 38 are slotted to receive the bottom bar of the cores. To one end of each core is secured an end wall 47 adapted to fit between the side walls 23 and 37 when the core is placed on the bottom plate 38. It will thus be apparent that each of the molds in which the cores 42 are disposed comprises side walls 23 carried by the shell, a side wall 37, an end wall 40, and a bottom plate 38 carried by the pallet assembly and an end wall 47 carried by the core itself.

In using the apparatus described herein for the molding of slabs, a pallet assembly 34 is disposed in each of the shells 21 and a core 42 is placed on each bottom plate 38, the jacks 28 being retracted so that the position of the pallet assemblies relative to the shells is as shown in Fig. 3. The molds thus provided may conveniently be filled by a traveling hopper moving along the upper flanges of channels 16. As already stated, the mounting of the shells is such as to permit vibration thereof within the frame 10. If desired, furthermore, means may be provided for holding the cores 42 in place to prevent dislodgement thereof as the result of the vibration effected by the movement of the hopper along the frame.

After the molds have been filled, the molded articles are partially cured therein. The curing operation is facilitated by steam evolved from the surface of the pool 14. The steam rises between the pans 31 of adjacent shells and has access to the mold walls 23 and 37 and also enters the cores 42 through the openings 46. All exterior surfaces of the mold walls are thus exposed to the steam, thereby expediting the curing operation.

When the molded articles have been partly cured, the jacks 28 are operated to partially eject the articles from the mold. The pallets are thereby raised to the position shown in dotted lines in Fig. 3, thus breaking the bond between the molded articles and the relatively fixed side walls 23. The latter are given a slight draft to facilitate removal of the molded articles. After being partially ejected, the articles are subjected to further curing. When the final curing has been completed, the cores 42 are lifted by appropriate means, thus breaking the bond between the molded articles, side walls 37, bottom plates 38, and end walls 40. After removal from the molds, the molded articles are detached from the cores and the latter are returned to the molds for a repetition of the molding operation.

It will be apparent from the foregoing description that the invention provides a simple, yet sturdy apparatus, and an efficient and expeditious method for making molded articles, such as slabs and the like. The disposition of the several mold walls is particularly advantageous since it permits the bond between the articles and the walls to be broken successively, thus relieving the apparatus of the excessive strain incident to simultaneous breakage of the bond with all the mold walls. The cost of the apparatus is relatively low since it may easily be fabricated from plate stock and standard structural shapes.

Although I have illustrated and described but a preferred embodiment of the invention, it will be understood that changes in the construction and practice disclosed may be made without departing from the spirit of the invention or the scope of the appended claims.

I claim:

1. Molding apparatus comprising a frame including spaced side walls, a liftable member removably disposed in said frame and including spaced bottom plates and an end wall, and side walls extending upwardly from the adjacent edges of said plates, a core removably disposed on each of said plates having an end wall, the end walls on the cores cooperating with said side walls and said first-mentioned end wall to define a plurality of molds.

2. In a method of making molded articles in a mold including side walls, a liftable bottom and a core thereon, the steps including pouring plastic material in said mold, partially curing the material in the mold, raising said bottom to partly eject the molded article from the mold, further curing the article while in partly ejected position, and finally applying lifting force to the core thereby separating the article from said bottom and completing the removal of the article from the mold.

3. Apparatus for molding slabs comprising a frame, a plurality of mold shells removably disposed in said frame side by side, each shell including spaced, parallel, outer side walls, a pallet adapted to be disposed in each shell including an end wall extending between said side walls, and inner side walls, lifting means for each pallet, and cores adapted to be disposed on said pallet and having an end wall cooperating with said side walls, the pallet and the end wall thereon to define a pair of molds.

4. Slab-molding apparatus comprising a shell having a side wall, a pallet adapted to be removably disposed in said shell, means for lifting the pallet from the shell, said pallet including a side wall spaced from the side wall of the shell and an end wall, and a core adapted to be disposed on said pallet, said core having an end wall adapted to cooperate with the side walls, the pallet and the end wall thereon to form a mold.

5. Slab-molding apparatus comprising a shell having spaced outer side walls, a pallet adapted to be removably disposed in said shell, said pallet including inner side walls and an end wall, and cores adapted to be disposed on said pallet, said cores having an end wall and one inner side wall, the pallet and the end wall thereon, to form a mold.

6. Apparatus for making molded articles comprising a shell provided with a side wall, a pallet disposable in said shell having a side wall spaced from the shell wall and an end wall cooperating with said side walls, and a core disposable on said pallet and having an end wall also cooperating with said side walls.

7. Apparatus for making molded articles comprising a mold including side walls and a removable bottom plate having an end wall thereon, and a core adapted to be inserted in said mold, said core having means forming an end wall adapted to cooperate with said walls and said bottom plate.

8. Apparatus for making molded articles comprising a shell, a liftable pallet in said shell, said pallet having a longitudinal slot therein extending the full length thereof for the admission of a heating medium, and a core removably disposed on said pallet and having a portion extending downwardly into said slot.

9. Apparatus for making molded articles comprising a shell in the form of a mold box, and a liftable pallet assembly therein, said box and assembly together defining a plurality of molds, said assembly having slots in the bottom thereof and being provided with a hollow dividing wall whereby to admit a heating medium to the exterior surfaces of substantially all the walls of the molds.

10. In a method of making molded articles in a mold including side walls, a liftable bottom and a core thereon, the steps including pouring a cementitious mix in said mold, curing the material in the mold, raising said bottom to partly eject the molded article from the mold and applying lifting force to the core, thereby separating the article from the said bottom and completing the removal of the article from the mold.

11. In a method of making molded articles in a mold including side walls, a liftable bottom and a core thereon, the steps including depositing a cementitious mix in said mold, curing the material in the mold, raising said bottom to partly eject the molded article from the mold, and finally applying lifting force to the core thereby separating the article from said bottom and completing the removal of the article from the mold.

12. In a method of making cementitious articles in a mold including a fixed side wall, a fixed end wall, and a liftable side wall and bottom plate, the steps including placing on the bottom plate a core extending the length of the mold, thereby dividing it into a pair of mold chambers, pouring a cementitious mix into said chambers, curing the articles thus molded while they remain in the chambers, and raising the bottom plate and liftable side wall to remove the core and the articles from the mold simultaneously.

13. In a method of making cementitious articles in a mold including a fixed side wall, a fixed end wall, and a liftable side wall and bottom plate, the steps including placing on the bottom plate a core extending the length of the mold, thereby dividing it into a pair of mold chambers, pouring a cementitious mix into said chambers, supplying a heating medium to the interior of the core to cure the articles thus molded while they remain in the chambers, and raising the bottom plate and liftable side wall to remove the core and the articles from the molds simultaneously.

14. A mold comprising a fixed end wall, a fixed side wall, a liftable side wall and bottom plate, a core removably disposed on said bottom plate and extending the full length of the mold, thereby dividing it into a pair of chambers, and means for elevating the bottom plate and liftable side wall to remove molded articles and said core from the mold simultaneously.

15. A mold as defined by claim 14 characterized by said bottom plate and core having openings adapted to aline when the core is disposed on the plate, whereby a heating medium may be admitted to the core from below.

16. In a method of making cementitious articles in a mold including side walls, a liftable bottom, and a core removably disposed thereon, the steps including pouring a cementitious mix into said mold, curing the articles thus molded while they remain in the mold, elevating the bottom plate with said core and the molded articles thereon, relative to the remainder of the mold, then elevating the core and the molded articles relative to the bottom plate, and finally removing the articles from the core.

ALBERT HENDERSON.